United States Patent [19]

Ernst et al.

[11] Patent Number: 4,543,763
[45] Date of Patent: Oct. 1, 1985

[54] PENETRATION CONTROLLING DEVICE AND SYSTEM

[75] Inventors: Richard J. Ernst, Palatine; Kent B. Godsted, Hinsdale, both of Ill.

[73] Assignee: Illinois Tool Works Inc., Chicago, Ill.

[21] Appl. No.: 400,812

[22] Filed: Jul. 22, 1982

[51] Int. Cl.⁴ .............................................. E04B 1/38
[52] U.S. Cl. ...................... 52/698; 411/187; 411/427; 411/531
[58] Field of Search ............ 52/127.1, 704, 705, 52/698; 411/539, 540, 187, 188, 394, 10, 11, 453, 531, 427, 160, 163, 433

[56] References Cited

U.S. PATENT DOCUMENTS

| | | | |
|---|---|---|---|
| 1,147,045 | 7/1915 | Feirce | 52/698 X |
| 1,418,052 | 5/1922 | Barton | 411/540 |
| 3,168,321 | 2/1965 | Glicksman | 411/531 X |
| 4,361,997 | 12/1982 | DeCaro | 52/410 X |

*Primary Examiner*—Carl D. Friedman
*Attorney, Agent, or Firm*—David I. Roche; Thomas W. Buckman

[57] ABSTRACT

The invention disclosed shows a device, method and system for installing threaded masonry anchors. A plate is used to control the rate of axial penetration of the anchor into a masonry structure. An opening in the plate allows engagement of the anchor with the plate. Rotation of the plate is prevented by various means. As the anchor advances and forms threads in the structure, the plate may be used to resist axial forces on the anchor in either axial directions thereby precluding stripping of threads formed in the masonry structure.

4 Claims, 9 Drawing Figures

4,543,763

PENETRATION CONTROLLING DEVICE AND SYSTEM

BACKGROUND AND SUMMARY OF THE INVENTION

This invention relates to the installation of masonry anchors and more particularly to the installation of screw threaded masonry anchors which form threads in masonry structures.

Prior art devices and methods have had two distinct problems involving the rate of axial penetration of such anchors. First, a workman installing a threaded masonry anchor in masonry which is either hard or which has no predrilled hole may have difficulty exerting enough axial force to insure a steady rate of axial penetration. Stripping of the threads formed in the structure occurs if the anchor does not penetrate continuously. Secondly, in softer masonry, a workman can inadvertently exert an excessive amount of axial force causing the anchor to penetrate too quickly. These problems are particularly troublesome when the properties of a particular structure are variable and not apparent. It may be difficult for a workman to determine the proper amount of axial force to insure continuous penetration and at the same time hold back to prevent stripping due to excess axial force. Prior art devices and methods generally rely on threads formed in the structure to provide resistance to axial forces. This reliance makes stripping of formed threads a major problem.

It is primary object of the present invention to provide a device, method and system for controlling the rate of axial penetration of a threaded masonry anchor to prevent stripping of threads formed in a masonry structure.

Another object of the invention is to provide a reusable device for controlling the rate of axial penetration of a threaded masonry anchor.

These objects are achieved by placing a plate between a threaded masonry anchor and a masonry structure. An opening in the plate allows engagement of the anchor with the plate. Rotation of the plate is prevented as axial and rotational forces are applied to the anchor. As the anchor passes through the plate, the plate may be used to resist axial forces on the anchor in either axial direction. By using the plate as an intermediate medium having a known strength, a workman can control the rate of axial penetration of the anchor and preclude stripping of threads formed in the masonry structure.

DETAILED DESCRIPTION OF PREFERRED EMBODIMENTS

Figure 2:
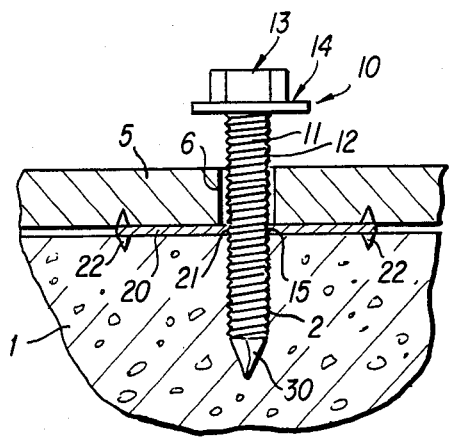
FIGS. 1 and 2 are elevational views of the invention showing various associated elements in partial section.

Referring to the drawings in which similar parts are identified by the same numerals. A plate 20 is used to regulate the advancement of an anchor 10. The anchor 10 includes an elongated shank 11, helical threads 12, a radially extending head 13 at one extremity of the shank, and a tip 30 at the other end of the shank. An article 5 to be secured to the structure 1 includes an aperture 6. A plate 20 includes an opening 21. As the anchor 10 is rotated and axial forces applied thereon, the anchor 10 is driven through the opening 21 and the threads 12 engage the plate 20. Rotation of the plate 20 is prevented by projections 22. As the anchor 10 advances into the structure 1, threads 2 are formed in the structure. The opening 21 in the plate 20 preferably has threads 15 tapped to match the threads of the anchor in order to allow engagement between the plate and the anchor.

Figure 1:
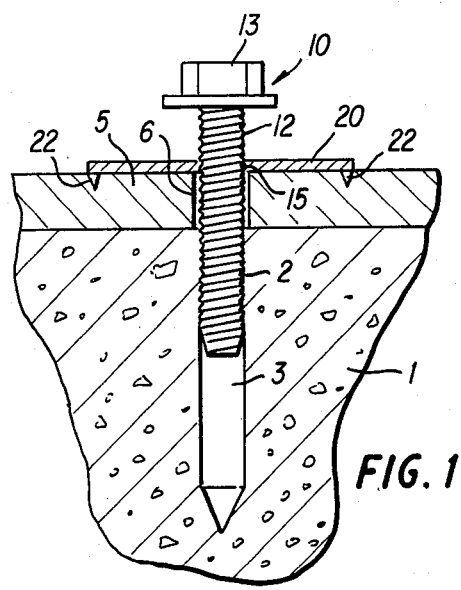

FIG. 1 shows an anchor 10 being driven through a plate 20 into a structure 1 in order to attach an article 5 to the structure. The structure has a predrilled hole 3 with a diameter less than the crest diameter of the anchor. The external threads 12 on the anchor form internal threads 2 in the hole 3 as the anchor is rotatingly driven into the structure. The external threads 12 also engage the plate 20 so that, the plate will prevent premature advancement of the anchor. When the plate 20 is held against rotation by projections 22 penetration of the anchor 10 proceeds at a controlled rate. By using a plate according to the invention, a workman will not be required to gauge the amount of axial force he applies to the anchor to be sure of proper formation of threads 2.

FIG. 1 shows threaded engagement between the anchor 10 and plate 20 which is achieved by providing tapped threads 15 in the opening 21 of the plate 20. It should be noted that this threaded engagement could be achieved by merely providing a helical opening in a thin plate as long as the strength of the plate is sufficient to resist axial forces transferred to it by the anchor 10 during installation.

It should be noted that the plate 20 shown in FIG. 1 also acts as a washer to enhance the clamping ability of the anchor 10.

Another important function of the plate 20 is that it tends to prevent stripping failure of the threads 2 when the anchor 10 is completely driven. When the head 13 of the anchor 10 seats against the plate 20 the threaded engagement between the anchor and the plate will cause driving torque to be transmitted to the plate. Because the projection 22 positively engage the article 5, the plate will provide significant resistance to rotation. Anchors of the prior art generally rely on threaded engagement between an anchor and a structure to resist stripping of an anchor. That is, rotative forces exerted on anchors of the prior art are resisted by the threads formed in the structure. In the present invention, the plate 20 resists rotation of the anchor and stresses on the threads 2 which have been formed in the structure are, therefore, greatly reduced. This is important because in some cases, significant driving torques will be required to drive the anchor into a structure. Therefore, it may be desirable to increase the difference between driving torque and the torque required to strip the anchor when it is fully seated. The dual engagement between plate 20 and the anchor 10 and between the plate 20 and the article 5 produces the desired increased stripping torque.

FIG. 2 shows an alternative embodiment of the invention in which the anchor 10 includes a drill tip 30, and the structure is without a predrilled hole. The plate 20 is placed between the article 5 and the structure 1. Projections 22 may engage either the article or the structure to prevent rotation of the plate. The aperture 21 may be preformed or may be formed by the drill tip 30. As in the embodiment shown in FIG. 1, the plate 20 of FIG. 2 engages the threads 12 as the anchor 10 and the threads 12 form internal threads 2 in the structure as the anchor is rotatingly driven. And, similar to the embodiment shown in FIG. 1, the plate 20 prevents premature advancement of the anchor into the structure thereby preventing destruction of the formed threads 2.

Another function of the plate 20 shown in FIG. 2 is that it may be used as a means to exert axial driving force on the anchor 10. Without a predrilled hole, significant resistance to penetration of the anchor may be encountered. Use of the plate 20 assures proper formation of the threads 2. Because of the engagement of the threads 12 with the plate 20 the threads 12 are forced to advance along a continuously helical path into the structure 1. Once the threads 12 are engaged by the plate 20, downward forces, such as the weight of a workman, may be easily transferred from the article 5 to the plate 20 and then to the anchor 10. Maximum axial driving forces which are available, e.g., the workman's weight, will come into play only if there is significant resistance to penetration. If no such resistance is encountered, the plate 20 will perform the function of preventing premature advancement of the anchor 10.

It should be noted that by exerting axial driving forces on the anchor 10 with the plate 20 there is less chance that the anchor will buckle than if axial driving force is exerted at the head 13 of the anchor. It should also be noted that the plate 20 need not be located between the article 5 and the structure 1 in order to be used as a means to exert axial driving forces. The plate as arranged in FIG. 2 could be used to exert downward force and to resist premature penetration.

Figure 3:
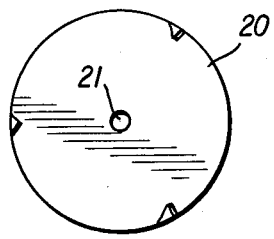
FIGS. 3 and 4 are plan views of alternative embodiments of a plate used in the invention.
Figure 4:
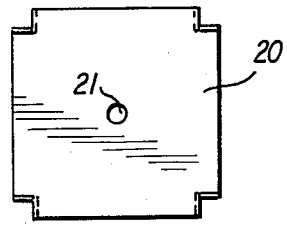
Figure 5:
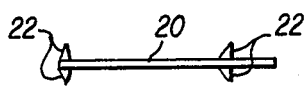
FIGS. 5 and 6 are elevational views of the plates of FIGS. 3 and 4 respectively.
Figure 6:
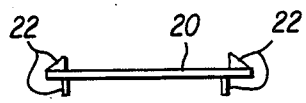

FIGS. 3 and 4 show plates 20 with circular and polygonal configurations. Means to prevent rotation of the plate include projections 22. FIGS. 5 and 6 are profile views of the plates of FIGS. 3 and 4 respectively. The projections 22 extend outwardly from the plane of the plate in both the upward and downward direction. The projections 22 may engage either the masonry structure 1 or the article 5 to be fastened to the structure in order to prevent rotation of the plate 20. It should be noted that in some environments friction alone between the plate 20 and either the structure 1 or the article 5 or both may be sufficient to prevent rotation of the plate 20.

Figure 7:
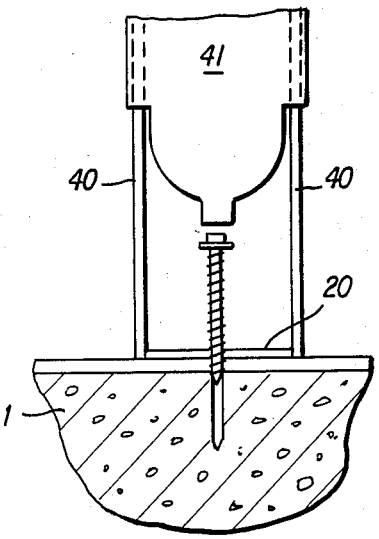
FIGS. 7 and 8 are elevational views showing alternative embodiments of the invention.

FIG. 7 shows an embodiment of the invention in which means to prevent rotation of the plate 20 include rotationally fixed extensions 40 of a driving tool 41. The plate 20 has a non-circular configuration so that interference between the plate and the extensions 40 prevents rotation of the plate. The extensions 40 are slidingly mounted at the axial extremity of the tool to allow for axial movement of the tool 41 relative to the structure 1. The tool rotationally advances the anchor into the structure while the extensions 40 prevent rotation of the plate 20. The plate 20 may be used to exert axial forces upon the anchor or to prevent premature advancement thereof. In either case the purpose of the plate 20 is to control the rate of penetration of the anchor 10 to assure proper formation of threads 2.

Figure 9:
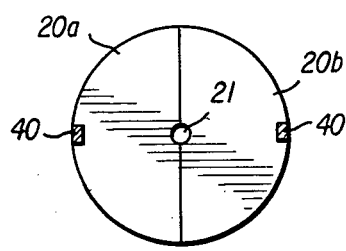
FIG. 9 is a sectional view taken along line 9—9 in FIG. 8.
Figure 8:
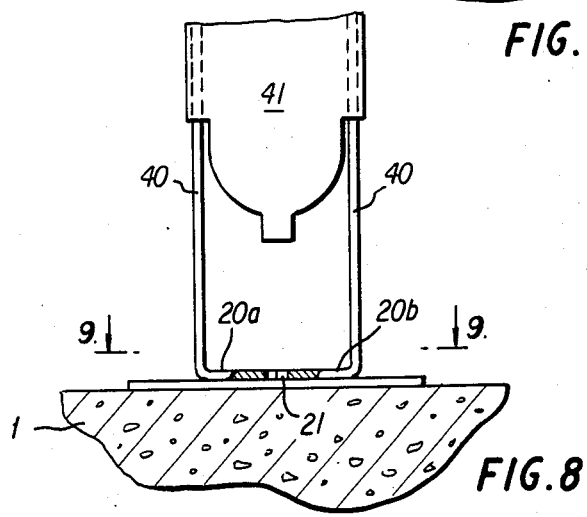

FIG. 8 shows an alternative embodiment of the invention which includes reusable means to control the rate of axial penetration of a threaded masonry anchor. In this embodiment the plate 20 is divided into a plurality of parts 20a, 20b, etc., as shown in FIG. 9. The parts are connected to a corresponding number of rotationally fixed extensions 40 of a driving tool 41. The extensions 40 are pivotally and slidingly mounted to the tool 41 to permit radial movement of the plate parts relative to one another, as well as to permit axial movement of the tool relative to the structure 1. The purpose of the pivotal connection of the extensions 40 to the tool 41 is to enable the plate parts 20a, 20b, etc. to be disengaged from the anchor prior to complete installation of the anchor.

The installation of an anchor utilizing the teachings and elements of the present invention is as follows. A plate 20 is placed between a structure 1 and a threaded masonry anchor 10. An article 5 to be secured to the structure is located either between the structure 1 and the plate 20 or between the plate 20 and the anchor 10. Rotation of the plate 20 is prevented by any of the several above disclosed means. Threads 2 on the anchor 10 engage the plate 20 and its corresponding internal thread configuration. As rotational and axial forces are applied to the anchor, threads 2 are formed in the structure 1. If the strength of the masonry structure is high or if a self drilling anchor is used, the plate 20 may be used as a means to apply downward axial force to the anchor 10 or to resist penetration thereof in order to insure continuous axial penetration of the anchor 10 into the structure 1. In either case the function of the plate is to control the rate of axial penetration of the anchor. An additional step of removing the plate 20 from engagement with the anchor 10 may be performed prior to complete installation of the anchor when an alternative embodiment of the invention is used.

An additional embodiment of the present invention includes the use of a self drill or self-tapping anchor. The plate in this embodiment, therefore, could have no pre-formed opening or a pilot hole, and the engagement between the anchor and the plate could result from the formation of threads in the plate by the anchor.

It should be noted that, while the present invention may be particularly useful in masonry structures, the invention is not limited to such structures. It is obvious that the invention is applicable when fastening to various other materials including concrete, wood and plastic. And, while the preferred embodiments of the present invention have been shown and described herein, it is obvious that many structural details may be changed without departing from the spirit and scope of the appended claims.

We claim:

1. A system for installing a self-tapping masonry anchor comprising:
   a self-tapping masonry anchor having a head with means for rotating said anchor, said anchor having a shank with helical threads thereon, said threads being substantially continuous from one end of said shank to another,
   a masonry structure capable of being tapped by said anchor,
   a plate placed between said anchor and said structure for the purpose of aiding and controlling the axial advancement of said anchor, said plate having an aperture adapted to continuously engage the threads of said anchor, the combination of elements being designed so that axial and rotational force to said anchor causes said anchor to move in its axial direction, in threaded engagement with said plate while the plate is restrained from rotation wherein the plate controls the rate of axial penetration of said anchor through the plate and into the masonry.

2. A system as described in claim 1, wherein said means include a rotationally fixed extension of a driving tool, said extension engaging said plate.

3. In a system as described in claim 1, wherein said plate is divided into a plurality of portions and said means include rotationally fixed extensions of a driving tool connected to said portions, said extensions being pivotally connected to said driving tool.

4. In combination with a masonry workpiece, a headed, threaded self-tapping masonry anchor having a substantially fully threaded shank, means for controlling and aiding penetration of said anchor into said workpiece during a tapping operation, said means comprising a plate having an aperture adapted to continuously engage threads of said anchor, said plate including at least one projection extending therefrom for engaging adjacent material and preventing rotation of said plate.

* * * * *